S. HARRIS.
HARVESTER.
APPLICATION FILED SEPT. 8, 1913.
1,136,798.
Patented Apr. 20, 1915.
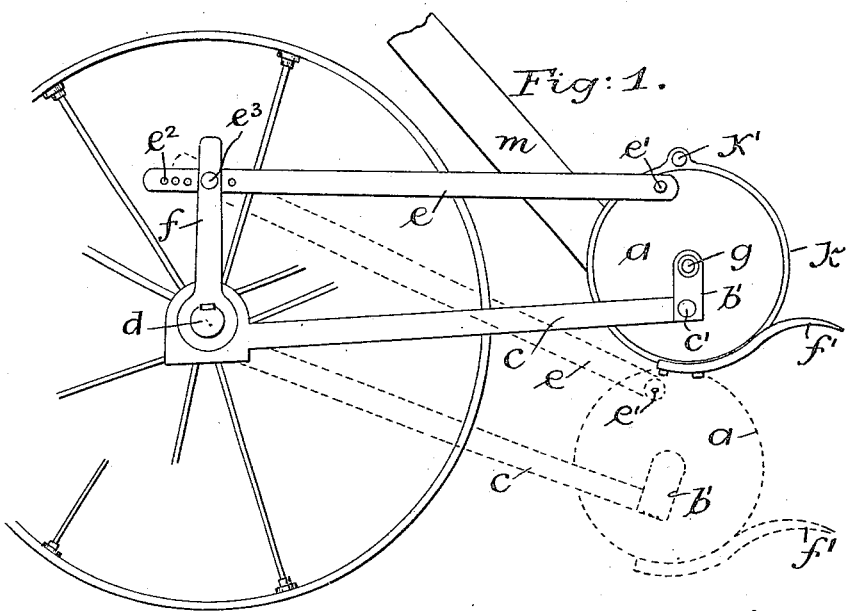
Fig: 1.
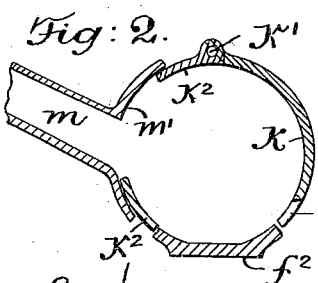
Fig: 2.
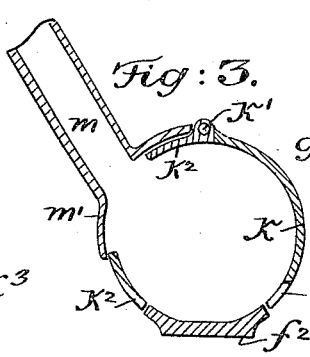
Fig: 3.
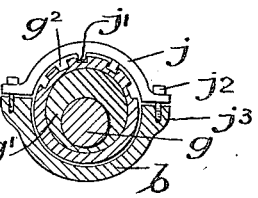
Fig: 7.
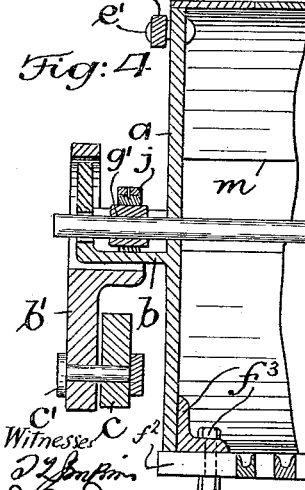
Fig: 4.
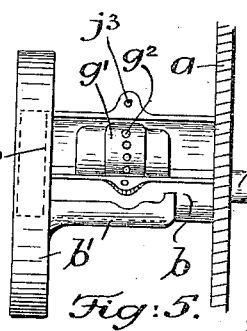
Fig: 5.
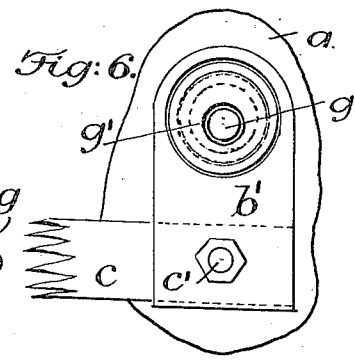
Fig: 6.
Fig: 8.
Witnesses:
D. L. Coffin
C. A. Rowe
Inventor
Samuel Harris
by
James L. Norris

UNITED STATES PATENT OFFICE.

SAMUEL HARRIS, OF DUMBLEYUNG, WESTERN AUSTRALIA, AUSTRALIA.

HARVESTER.

1,136,798.  Specification of Letters Patent.  Patented Apr. 20, 1915.

Application filed September 8, 1913. Serial No. 788,645.

*To all whom it may concern:*

Be it known that I, SAMUEL HARRIS, a subject of the King of Great Britain, and residing at Dumbleyung, Western Australia, Commonwealth of Australia, have invented certain new and useful Improvements in Harvesters, of which the following is a specification.

This invention comprises firstly means whereby the comb of the harvester is continuously maintained at the initial or predetermined angle or "set" during the harvesting operations and irrespective of the height of the comb from the ground. The advantage lies in that whether the comb is in the raised or lowered position the grain heads are neither swept down nor run off from the beater as is the case with present harvesters but on the contrary said grain heads are reliably guided and conveyed by the comb into the beater drum chamber.

The second chief improvement resides in mounting the beater drum in eccentric bearings whereby the distance between the drum and the comb may be varied.

The third chief improvement resides in the neck of the grain chute or throat being maintained at its full width, notwithstanding the radial movement of the drum casing.

The construction of these and other related improvements will now be explained with the aid of the attached drawings in which—

Figure 1 is an elevation showing the invention as applied to a harvester and in said figure the broken lines show the altered or lowered position of the drum the comb and the supporting arms but having the angle or set unaltered. Figs. 2 and 3 are sectional views of the drum casing in its raised and lowered positions respectively but having the grain throat fully open in both positions. Fig. 4 is a sectional view of the cheek plates and eccentric bearing for the beater shaft. Fig. 5 is an elevation of the cheek plate brackets and eccentric bearing but with the adjustment cap removed. Fig. 6 is a side face view of same. Fig. 7 a sectional view of the eccentric bearing and cap and Fig. 8 is a detail view showing the self alinement means for said bearings.

In these drawings $a$ are the end cheek plates provided at each end of the drum chamber and having thereon the integral and outstanding lug as $b$ see Fig. 4. These lugs $b$ and plates $a$ are movably held in the bracket bearing $b^1$ and to the lower end of same is secured the carrier arm $c$ by the pin $c^1$. This arm at its other end is pivotally held on the axle $d$ of the harvester as seen in Fig. 1. To each cheek plate is pivoted a bar as $e$ by the bolt $e^1$ and said bars at their outer ends are adjustably connected by holes $e^2$ and pivot pin $e^3$ to an upstanding arm as $f$ rigidly keyed to the axle $d$. The adjustment of said bars determines the angle or set of the comb $f^1$ as seen in Fig. 1. By these means and notwithstanding the radial movement of the harvester as a whole on the axle $d$ the setting arm $e$ retains the comb $f^1$ at the initial set and independent of the height of said comb from the ground. The beater casing and attached comb constitute a unit which is adapted to move independently of the harvester body, being pivotally carried on the axle $d$ by the bars $c$ and held by the arms $e$ which latter act as a resistant agent to any alteration of the set of the comb during the aforesaid radial movement of the harvester on its axle $d$ as seen in Fig. 1. The comb $f^1$ by its transverse plate $f^2$ is secured to the cheek plates $a$ by lugs and bolts $f^3$ see Fig. 4. The beater shaft $g$ works in the eccentric bearings $g^1$, the latter having the recesses or notches $g^2$ whereby locking engagement is made for the bearings with the cap $j$ having the tooth $j^1$ whereby said bearing $g^1$ is set in the desired position to give the approved distance between the beater and the comb. This cap $j$ is held by the stud bolts $j^2$ to the ears $j^3$ of the lug bracket $b$ as seen in Figs. 4 and 7. The lug $b$ is recessed as at $b^2$ to act as an alinement or guide for the bearing $g^1$.

In order that the grain throat $m$ may always remain fully open notwithstanding the radial movement of the harvester above mentioned the beater casing $k^2$ is made with an opening of greater width than that of the throat $m$ and having a door as $k$, said door being hinged at $k^1$ to the casing $k^2$ which casing telescopes with the base $m^1$ of the grain throat $m$ as seen in Figs. 2 and 3. The door $k$ terminates short of the comb $f^1$ and thus provides for a longitudinal opening $k^3$ immediately above said comb through which the grain heads enter the beater casing. The base $m^1$ of the throat radially slides on said drum casing $k^2$. In this invention the beater shaft $g$ does not bear the weight of the comb, said comb being borne by the end plates *a* and the latter being carried by the pivotal arms *c* and *e* as above mentioned.

What I claim as my invention and desire to secure by Letters Patent is:—

1. In a harvester, in combination, a beater drum including a cylindrical body, a grain throat associated with the drum, the latter having an opening adjacent said throat and registering therewith, a shaft extending longitudinally through said body, end plates forming end closures for said body, a wheeled axle, upright arms keyed to said axle, arms pivotally mounted upon said axle, brackets pivotally mounted at the ends of said pivotally mounted arms and supporting said end plates, other arms pivotally connected to said end plates, adjustable pivotal connections between said last named arms and the upper ends of said upright arms, and a comb projecting forwardly from said drum, and supported by said end plates, the drum also having a longitudinal opening above said comb through which the grain heads enter and which alines with said first-named opening, substantially as and for the purpose set forth.

2. In a harvester, in combination, a beater drum including a cylindrical body, a grain throat associated with the drum, the latter having an opening adjacent said throat and registering therewith, a shaft extending longitudinally through said body, end plates forming end closures for said body, a wheeled axle, upright arms keyed to said axle, arms pivotally mounted upon said axle, the end plates having lugs thereon, brackets pivotally mounted at the ends of said pivotally mounted arms and having openings receiving said lugs therein, concentric bearings for said shaft carried by said lugs, other arms pivotally connected to said end plates, adjustable pivotal connections between said last named arms and the upper ends of said upright arms, and a comb projecting forwardly from said drum, and supported by said end plates, the drum also having a longitudinal opening above said comb through which the grain heads enter and which alines with said first-named opening, substantially as and for the purpose set forth.

3. In a harvester, in combination, a beater drum including a cylindrical body, a shaft extending longitudinally through said body, end plates forming end closures for said body, a wheeled axle, upright arms keyed to said axle, arms pivotally mounted upon said axle, brackets pivotally mounted at the ends of said pivotally mounted arms and supporting said end plates, other arms pivotally connected to said end plates, adjustable pivotal connections between said last named arms and the upper ends of said upright arms, a comb projecting forwardly from said drum, and supported by said end plates, and a grain throat having a curved shoe arranged in telescoping relation to the beater drum, the drum having an opening adjoining and registering with said throat and of greater width than the latter, whereby the neck of said throat is maintained fully open in any radial adjustment of said drum relatively to said axle, the drum also having a longitudinal opening above said comb through which the grain heads enter and which alines with said first-named opening, substantially as and for the purpose set forth.

In testimony whereof I have hereunto set my hand in presence of two subscribing witnesses.

SAMUEL HARRIS.

Witnesses:
ALDBARAUGH H. WAVIER,
S. B. NENKE.

Copies of this patent may be obtained for five cents each, by addressing the "Commissioner of Patents, Washington, D. C."